US012340763B2

(12) United States Patent
Hu et al.

(10) Patent No.: US 12,340,763 B2
(45) Date of Patent: Jun. 24, 2025

(54) DISPLAY DEVICE AND ELECTRONIC EQUIPMENT

(71) Applicant: TCL CHINA STAR OPTOELECTRONICS TECHNOLOGY CO., LTD., Guangdong (CN)

(72) Inventors: Xiong Hu, Guangdong (CN); Xiaolong Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,978

(22) PCT Filed: Jun. 30, 2022

(86) PCT No.: PCT/CN2022/103113
§ 371 (c)(1),
(2) Date: Jul. 17, 2022

(87) PCT Pub. No.: WO2023/236295
PCT Pub. Date: Dec. 14, 2023

(65) Prior Publication Data

US 2024/0194156 A1 Jun. 13, 2024

(30) Foreign Application Priority Data

Jun. 9, 2022 (CN) ......................... 202210653529.8

(51) Int. Cl.
*G09G 3/34* (2006.01)

(52) U.S. Cl.
CPC ....... *G09G 3/3406* (2013.01); *G09G 2310/08* (2013.01); *G09G 2320/0233* (2013.01);
(Continued)

(58) Field of Classification Search
None
See application file for complete search history.

(56) References Cited

U.S. PATENT DOCUMENTS

2008/0284720 A1* 11/2008 Fukutome ........... G02F 1/13454
349/116
2008/0316157 A1* 12/2008 Park ..................... G09G 3/3611
345/89
(Continued)

FOREIGN PATENT DOCUMENTS

CN 105869581 A 8/2016
CN 111754952 A 10/2020
(Continued)

OTHER PUBLICATIONS

International Search Report in International application No. PCT/CN2022/103113,mailed on Dec. 21, 2022.
(Continued)

*Primary Examiner* — Parul H Gupta
(74) *Attorney, Agent, or Firm* — PV IP PC; Wei Te Chung

(57) ABSTRACT

A display device and an electronic equipment are provided. The display device includes a display panel, a backlight module, and a timing controller. By configuring pixel electrodes to have equal or approximately equal first voltages and second voltages when the backlight source is turned on or turned off, the voltages of the pixel electrodes can be prevented from being affected by the backlight. This further stabilizes a voltage difference between the pixel electrodes and the common electrode and improves brightness uniformity of the display panel.

16 Claims, 4 Drawing Sheets

(52) U.S. Cl.
CPC ............... *G09G 2320/0276* (2013.01); *G09G 2320/0673* (2013.01)

(56) References Cited

U.S. PATENT DOCUMENTS

| | | | | |
|---|---|---|---|---|
| 2012/0162294 A1* | 6/2012 | Choi | .................... | G09G 3/3648 345/694 |
| 2019/0228718 A1* | 7/2019 | Lee | ...................... | G09G 3/3406 |

FOREIGN PATENT DOCUMENTS

| | | | |
|---|---|---|---|
| CN | 112216237 | A | 1/2021 |
| CN | 112825240 | A | 5/2021 |
| KR | 20040078300 | A | 9/2004 |
| KR | 20180052367 | A | 5/2018 |

OTHER PUBLICATIONS

Written Opinion of the International Search Authority in International application No. PCT/CN2022/103113, mailed on Dec. 21, 2022.
Chinese Office Action issued in corresponding Chinese Patent Application No. 202210653529.8 dated May 25, 2024, pp. 1-8.

* cited by examiner

| default grayscale array (10bits) |
| --- |
| 0 |
| 1 |
| 2 |
| 3 |
| 4 |
| ...... |
| 1022 |
| 1023 |

FIG. 4

| grayscale mapping table | |
|---|---|
| default grayscale array（10bits） | target grayscale array（12bits） |
| 0 | 0 |
| 1 | 5 |
| 2 | 9 |
| 3 | 14 |
| 4 | 18 |
| ...... | ...... |
| 1022 | 4091 |
| 1023 | 4095 |

FIG. 5

DISPLAY DEVICE AND ELECTRONIC EQUIPMENT

FIELD OF INVENTION

The present application relates to a field of display technology, and particularly relates to a display device and electronic equipment.

BACKGROUND OF INVENTION

When a semiconductor element of a display panel is affected by light, electron mobility of the semiconductor element will change, resulting in a change in charging effect of sub-pixels in the display panel. Therefore, a phenomenon of uneven display brightness of light and dark, that is, a water ripple phenomenon may be caused during a retention period of liquid crystals, which degrades display quality.

Technical Problem

The present application provides a display device and an electronic equipment to alleviate the technical problem of uneven display brightness caused by backlight.

SUMMARY OF INVENTION

In a first aspect, the present application provides a display device, which includes a display panel, a backlight module, and a timing controller. The display panel includes: a plurality of sub-pixels, wherein each sub-pixel includes a pixel electrode; a backlight module including a backlight light source for the display panel; and a timing controller connected to the display panel and the backlight module, wherein the timing controller controls the pixel electrode to have a first voltage in response to the backlight light source being turned on, and controls the pixel electrode to have a second voltage in response to the backlight light source being turned off, and wherein the first voltage is equal to or approximately equal to the second voltage.

In some embodiments, the timing controller includes a storage unit storing a default grayscale array and a grayscale mapping table; and wherein when the backlight light source is in a turn-on state, the timing controller calls the grayscale mapping table, and when the backlight light source is in a turn-off state, the timing controller calls the default grayscale array.

In some embodiments, the grayscale mapping table includes a target grayscale array, each target grayscale in the target grayscale array is mapped with a corresponding default grayscale in the default grayscale array, and in each mapping relationship, the target grayscale is greater than the default grayscale.

In some embodiments, when the backlight light source is in the turn-on state, the timing controller outputs a corresponding grayscale to a sub-pixel according to the target grayscale array to control the pixel electrode to have the first voltage, and when the backlight light source is in the turn-off state, the timing controller outputs a corresponding grayscale to the sub-pixel according to the default grayscale array to control the pixel electrode to have the second voltage.

In some embodiments, when the backlight light source is in the turn-on state, the timing controller maps target grayscales in the target grayscale array through corresponding default grayscales in the default grayscale array to output the target grayscales in the target grayscale array.

In some embodiments, the timing controller controls the backlight light source to turn on or turn off through a pulse width adjustable signal, wherein the timing controller further includes a level detection unit configured to detect a potential state of the pulse width adjustable signal.

In some embodiments, when the level detection unit detects that the pulse width adjustable signal is in a high potential state, the timing controller controls the backlight light source to be in the turn-on state, and when the level detection unit detects that the pulse width adjustable signal is in a low potential state, the timing controller controls the backlight light source to be in the turn-off state; or when the level detection unit detects that the pulse width adjustable signal is in a low potential state, the timing controller controls the backlight light source to be in the turn-on state, and when the level detection unit detects that the pulse width adjustable signal is in a high potential state, the timing controller controls the backlight light source to be in the turn-off state.

In some embodiments, the display panel further includes a data driver, wherein the data driver is connected to the timing controller and the plurality of sub-pixels and configured to output a corresponding data signal to each sub-pixel under control of the timing controller, and wherein each target grayscale or each default grayscale is a corresponding pulse amplitude of the data signal.

In some embodiments, each sub-pixel further includes a thin film transistor connected to the pixel electrode, wherein electron mobility of the thin film transistor when the backlight light source is in the turn-on state is less than electron mobility of the thin film transistor when the backlight light source is in the turn-off state.

In some embodiments, the backlight light source includes a micro-light-emitting diode array, the backlight light source includes one or a plurality of backlight sub-regions, and the timing controller controls brightness of each of the plurality of backlight sub-regions. In a second aspect, the present application provides electronic equipment including the display device in at least one of the above-mentioned embodiments, wherein the display panel is a liquid crystal display panel.

Advantages

The display device and the electronic equipment of the present application can prevent voltages of the pixel electrodes from being affected by backlight by configuring the pixel electrodes to have equal or approximately equal first voltages and second voltages when a backlight source is turned on or turned off. Furthermore, a voltage difference between the pixel electrodes and the common electrode is stabilized, brightness uniformity of the display panel is improved, and the water ripple phenomenon is prevented.

DESCRIPTION OF DRAWINGS

FIG. 4 is a schematic structural diagram of a default grayscale array provided by an embodiment of the present application.

FIG. 5 is a schematic structural diagram of a grayscale mapping table provided by an embodiment of the present application.

DETAILED DESCRIPTION OF PREFERRED EMBODIMENTS

In order to make the objectives, technical solutions, and effects of the present application clearer and more specific, the present application will be further described in detail below with reference to accompanying drawings and examples. It is noted that the specific embodiments described herein are only used to explain the present application, but not to limit the present application.

Figure 1:
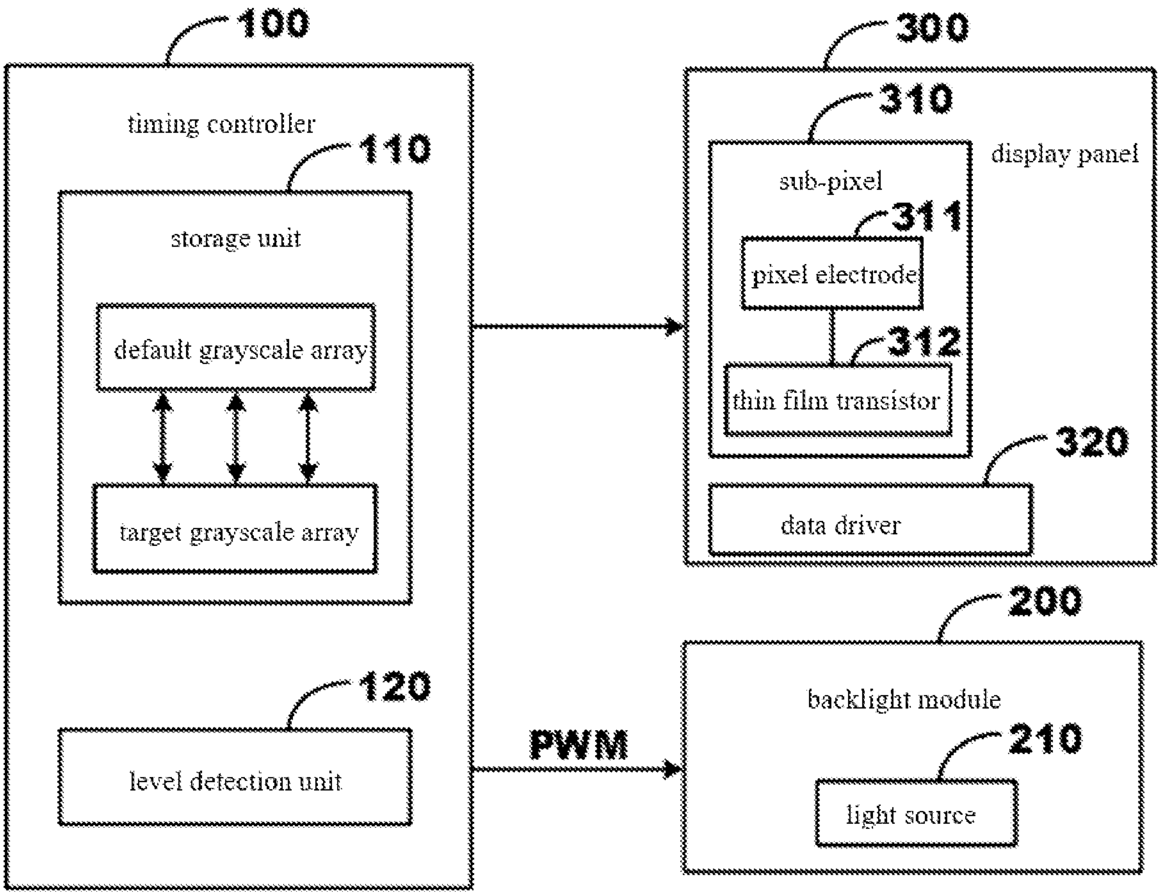
FIG. 1 is a schematic structural diagram of a display device provided by an embodiment of the present application.

In view of the aforesaid technical problem of uneven display of light and dark caused by the backlight, the present embodiment provides a display device, please refer to FIG. 1 to FIG. 5. As shown in FIG. 1, the display device includes a display panel 300, a backlight module 200, and a timing controller 100. The display panel 300 includes a plurality of sub-pixels 310, and each sub-pixel 310 includes a pixel electrode 311. The backlight module 200 is configured to provide the backlight light source 210 to the display panel 300. The timing controller 100 is connected to the display panel 300 and the backlight module 200. The timing controller 100 controls the pixel electrode 311 to have a first voltage in response to the backlight light source 210 being turned on, and controls the pixel electrode 311 to have a second voltage in response to the backlight light source 210 being turned off, and the first voltage is equal to or approximately equal to the second voltage.

It can be understood that, in the display device provided in the present embodiment, by configuring equal or approximately equal first voltage and second voltage for the pixel electrode 311 when the backlight source is turned on or turned off, the voltage of the pixel electrode 311 can be prevented from being affected by the backlight. This further stabilizes the voltage difference between the pixel electrode 311 and the common electrode, improves the brightness uniformity of the display panel 300, and reduces or prevents the water ripple phenomenon.

It should be noted that each sub-pixel 310 may further include a common electrode, a liquid crystal capacitor, and a storage capacitor. The pixel electrode 311 is connected to one end of the liquid crystal capacitor and one end of the storage capacitor, and the common electrode is connected to at least one of the other end of the liquid crystal capacitor or the other end of the storage capacitor. Under the condition that the voltage of the common electrode remains unchanged, the first voltage and the second voltage applied to the pixel electrode 311 are equal or approximately equal. Therefore, the voltage across the liquid crystal capacitor and the voltage across the storage capacitor can remain unchanged regardless of whether the backlight source 210 is turned on or turned off. Correspondingly, the deflection angles of the liquid crystal remain unchanged, and the difference in display brightness is reduced or eliminated, which improves the brightness uniformity of the display.

In one embodiment, the timing controller 100 includes a storage unit 110, and the storage unit 110 stores a default grayscale array and a grayscale mapping table. When the backlight light source 210 is in a turn-on state, the timing controller 100 calls the grayscale mapping table, and when the backlight light source 210 is in a turn-off state, the timing controller 100 calls the default grayscale array.

It should be noted that, in the related art, regardless of whether the backlight light source 210 is turned on or turned off, the timing controller 100 always uses the default grayscale array to control the data driver 320 to output the corresponding data signal. However, when the backlight source 210 is turned on, the electron mobility of the thin film transistor 312 in the sub-pixel 310 is reduced due to the influence of light, resulting in insufficient charging of the same data signal for the sub-pixel 310 when the backlight source 210 is turned on. Compared with the case where the same data signal charges the sub-pixel 310 when the backlight light source 210 is turned off, the voltage of the pixel electrode 311 of the sub-pixel 310 charged when the backlight light source 210 is turned on is low, so that the display brightness is reduced, resulting in uneven display brightness.

In this embodiment, when the backlight light source 210 is in different states, two different gray-scale arrays are used, so that the voltage of the pixel electrode 311 can be stabilized at the first voltage or the second voltage. This keeps the deflection angles of the liquid crystal relatively stable, which can keep the brightness relatively stable.

In one embodiment, the grayscale mapping table includes a target grayscale array, each target grayscale in the target grayscale array is mapped to a corresponding default grayscale in the default grayscale array, and in the same mapping relationship, the target grayscale is greater than the default grayscale.

It should be noted that, in this embodiment, the default grayscale array can be used by the timing controller 100 alone when the backlight light source 210 is turned off, it can also be used in combination with the target grayscale array when the backlight light source 210 is turned on. For example, the two can form the aforesaid grayscale mapping table. It can be understood that this not only ensures the correct execution of this embodiment, but also reduces the occupation of storage space, reduces the storage space required by the storage unit 110, and further reduces the purchase cost of the storage unit 110.

In one embodiment, when the backlight light source 210 is in a turn-on state, the timing controller 100 outputs the corresponding gray scale to the sub-pixel 310 according to the target gray scale array, to control the pixel electrode 311 to have the first voltage, and when the backlight light source 210 is in a turn-off state, the timing controller 100 outputs the corresponding gray scale to the sub-pixel 310 according to the default gray scale array, to control the pixel electrode 311 to have the second voltage.

It should be noted that each target grayscale in the target grayscale array output by the timing controller 100 can adjust/define the pulse amplitude of the data signal, to improve the problem of insufficient charging by increasing the charging potential of the data signal when the electron mobility of the thin film transistor 312 is reduced. In this way, the voltage of the pixel electrode 311 can be kept relatively stable.

In one embodiment, when the backlight light source 210 is in the turn-on state, the timing controller 100 maps the corresponding target grayscale in the target grayscale array through each default grayscale in the default grayscale array to output the corresponding target grayscale in the target grayscale array.

It should be noted that, in this embodiment, the corresponding target grayscale is called through the direct mapping relationship between the default grayscale array and the target grayscale array, which reduces intermediate conversion steps and is simpler and more efficient. For example, the timing controller 100 first finds an existing default grayscale, then finds the target grayscale corresponding to the existing default grayscale according to the grayscale mapping table, and finally calls the corresponding target grayscale to control the data signal generated by the data driver 320. That is, the timing controller 100 can improve the brightness uniformity of the display panel 300 by adding a mapping step on the original basis.

In one embodiment, the timing controller 100 controls the turn-on or turn-off of the backlight light source 210 through the adjustable pulse width signal PWM. The timing controller 100 further includes a level detection unit 120, and the level detection unit 120 is used for detecting the potential state of the adjustable pulse width signal PWM.

Figure 2:
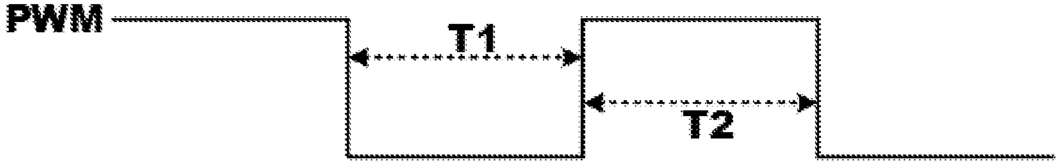
FIG. 2 is a schematic waveform diagram of a pulse width adjustable signal provided by an embodiment of the present application.

In one embodiment, as shown in FIG. 2, when the level detection unit 120 detects that the adjustable pulse width signal PWM is in a high potential state, such as a time period T2, the timing controller 100 controls the backlight light source 210 to be in a turn-on state, and when the level detection unit 120 detects that the adjustable pulse width signal PWM is in a low potential state, such as a time period T1, the timing controller 100 controls the backlight light source 210 to be in a turn-off state; or when the level detection unit 120 detects that the adjustable pulse width signal PWM is in a low potential state, such as a time period T1, the timing controller 100 controls the backlight light source 210 to be in a turn-on state, and when the level detection unit 120 detects that the adjustable pulse width signal PWM is in a high potential state, such as a time period T2, the timing controller 100 controls the backlight light source 210 to be in a turn-off state.

In one embodiment, the display panel 300 further includes a data driver 320, and the data driver 320 is connected to the timing controller 100 and the plurality of sub-pixels 310 for outputting corresponding data signals to the corresponding sub-pixels 310 under the control of the timing controller 100, wherein, each target grayscale or each default grayscale is the corresponding pulse amplitude in the data signal.

It should be noted that each target grayscale or each default grayscale can define or limit the corresponding pulse amplitude in the data signal, and the increase of pulse amplitude in the data signal can improve the phenomenon of insufficient charging of the corresponding sub-pixel 310, thereby improving the brightness uniformity of display.

In one embodiment, as shown in FIG. 1, each sub-pixel 310 further includes a thin film transistor 312, wherein one of the source or the drain of the thin film transistor 312 is connected to the pixel electrode 311. The electron mobility of the thin film transistor 312 when the backlight light source 210 is turned on is less than that of the thin film transistor 312 when the backlight light source 210 is turned off.

The other one of the source or the drain of the thin film transistor 312 can be connected to the data driver 320 through a data line to transmit a data signal to the corresponding thin film transistor 312, and then charge the liquid crystal capacitor and the storage capacitor through the thin film transistor 312.

In one embodiment, the backlight light source 210 includes micro-LEDs distributed in an array, the backlight light source 210 are configured as at least one backlight sub-region, and the timing controller 100 controls the backlight brightness of each backlight sub-region.

It should be noted that in this embodiment, micro light emitting diodes (MLEDs) are used as the backlight light source 210, which have superior performance in terms of high brightness, high contrast, and ultra-high resolution and color saturation. The backlight brightness of each backlight partition can be adjusted individually, making the adjustment of the backlight brightness more flexible and accurate.

Figure 3:
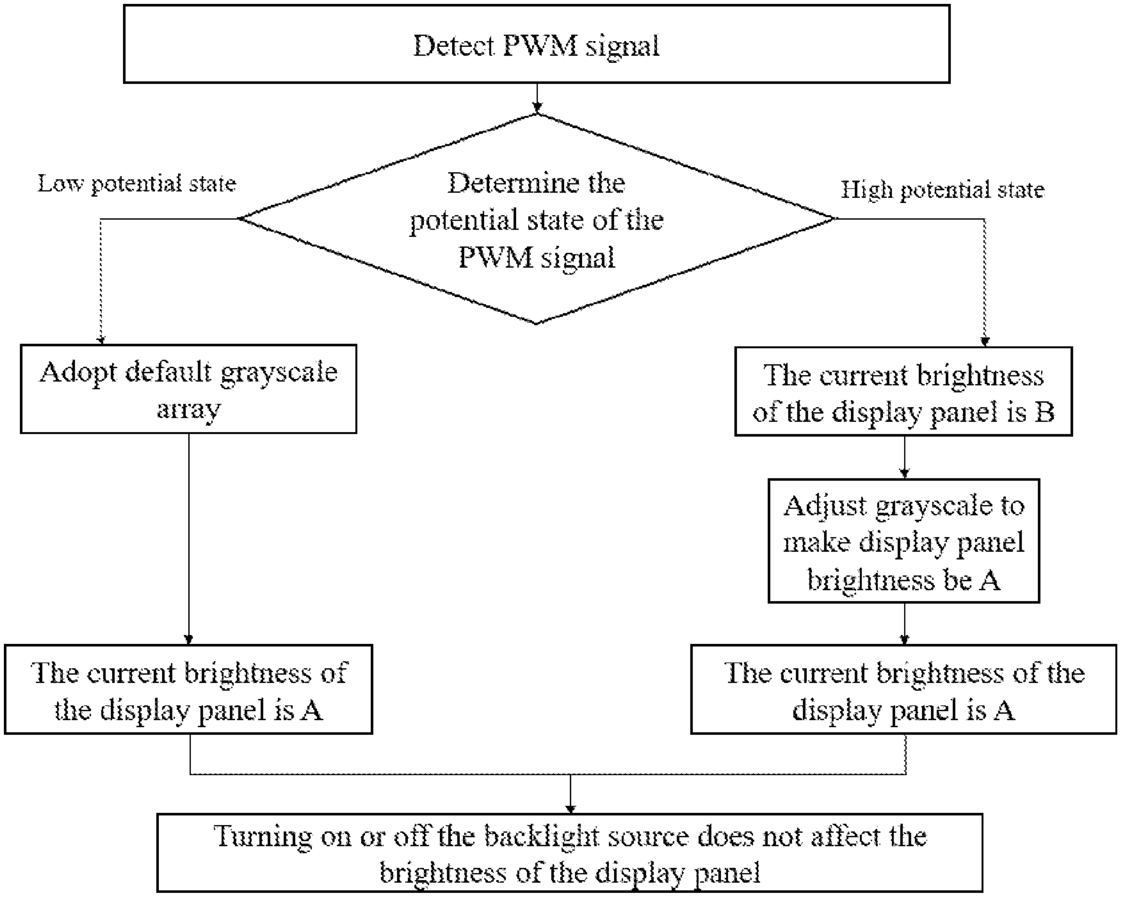
FIG. 3 is a schematic flowchart of display brightness adjustment according to an embodiment of the present application.

In conclusion, the uniform adjustment process of the display brightness of the above-mentioned display device is shown in FIG. 3. First, the PWM signal, that is, the adjustable pulse width signal PWM, is detected, and then the potential state of the PWM signal is judged. If the PWM signal is in a low potential state, that is, the backlight light source 210 is in a turn-off state, the default gray-scale array is used to control the voltage of the pixel electrode 311, and the current brightness of the display panel 300 is A at this time. If the PWM signal is in a high potential state, that is, the backlight light source 210 is in a turn-on state, and the default grayscale array is used to control the voltage of the pixel electrode 311, the current brightness of the display panel 300 is B. In this case, the gray scale is adjusted to control the current brightness of the display panel 300 to be A by using the target gray scale. At this time, when the current brightness of the display panel 300 is A, the adjusted gray scale adopted by the timing controller 100 can be recorded, and each adjusted grayscale is made into a target grayscale array, and then programmed into the storage unit 110 for later use. That is, the display device provided by the present application will not affect the brightness of the display panel 300 regardless of whether the backlight source is turned on or turned off. In this way, the display brightness of the display panel 300 is not affected by the electron mobility of the thin film transistor 312 caused by the backlight, so that the uniformity of the display brightness is improved.

Specifically, the process of obtaining the grayscale mapping table is as follows: A group of voltages of the pixel electrodes 311, namely an array X, is obtained through measurement when the backlight light source 210 is turned on under the grayscale images of 0-255, and the array X includes 256 voltage values corresponding to 0-255 grayscale, respectively. When the backlight light source 210 is turned off, a group of voltages of the pixel electrodes 311, that is, an array Y is obtained by measuring, and the array Y also includes 256 voltage values corresponding to 0-255 grayscale, respectively.

Under the gray scale of 0-255, the backlight light source 210 is turned on to adjust the gray scale output by the timing controller 100, so that the voltage of the pixel electrode 311 is (or close to) the array Y in one cycle. At this time, each corresponding grayscale output by the timing controller 100 under the grayscale of 0-255 is recorded, and each corresponding grayscale output is the target grayscale array. Currently, the 0-255 grayscale is the default grayscale array.

The default grayscale array composed of grayscales 0-255 can be defined by 8 bits, that is, each combination of the 8 bits represents a grayscale.

Certainly, the default grayscale array can also be defined by 10 bits as shown in FIG. 4. For example, a combination of 10 bits of 0000000000 can be used to represent the default grayscale 0 in the default grayscale array, and the others can be sequentially analogy. The combination of 10 bits can be used to represent the default grayscale 1, the default grayscale 2, the default grayscale 3, the default grayscale 4 . . . the default grayscale 1022, and the default grayscale 1023 in the default grayscale array.

Correspondingly, the target grayscale array can be defined by 12 bits as shown in FIG. 5. For example, a combination of 12 bits, 000000000000, can be used to represent the target grayscale 0 in the target grayscale array, and the others can be sequentially analogy. The combination of 12 bits can be used to represent the target grayscale 1, the target grayscale 5, the target grayscale 9, the target grayscale 14, the target grayscale 18 . . . , the target grayscale 4091, and the target grayscale 4095.

The default grayscale array and the target grayscale array in FIG. 5 are in a mapping relationship. That is, the default grayscales 0, 1, 2, 3, 4, . . . , 1022, and 1023 in the default grayscale array are respectively mapped to the target grayscales 0, 1, 5, 9, 14, 18 . . . , 4091, and 4095 in the target grayscale array.

When the backlight light source 210 is in a turn-off state, the timing controller 100 adopts the default gray scale of 0, and when the backlight light source 210 is in a turn-on state, the timing controller 100 searches for and adopts the target grayscale 0 through the default grayscale 0. When the backlight light source 210 is in a turn-off state, the timing controller 100 adopts the default grayscale of 1, and when the backlight source 210 is in a turn-on state, the timing controller 100 searches for and adopts the target grayscale 5 through the default grayscale 1. When the backlight source 210 is in a turn-off state, the timing controller 100 adopts the default grayscale 2, and when the backlight source 210 is in a turn-on state, the timing controller 100 searches and adopts the target grayscale 9 through the default grayscale 2. When the backlight light source 210 is in a turn-off state, the timing controller 100 adopts the default grayscale 3, and when the backlight light source 210 is in a turn-on state, the timing controller 100 searches through the default grayscale 3 and adopts the target grayscale 14. When the backlight light source 210 is in a turn-off state, the timing controller 100 adopts the default grayscale 4, and when the backlight light source 210 is in a turn-on state, the timing controller 100 searches through the default grayscale 4 and adopts the target grayscale 18 . . . and so on. When the backlight light source 210 is in a turn-off state, the timing controller 100 adopts the default grayscale 1022, and when the backlight light source 210 is in a turn-on state, the timing controller 100 searches through the default grayscale 1022 and adopts the target grayscale 4091. When the backlight light source 210 is in a turn-off state, the timing controller 100 adopts the default grayscale 1023, and when the backlight light source 210 is in a turn-on state, the timing controller 100 searches and adopts the target grayscale 4095 through the default grayscale 1023.

In one embodiment, this embodiment provides an electronic device, the electronic device includes the display device in at least one of the above embodiments, wherein the display panel 300 is a liquid crystal display panel 300.

It can be understood that the electronic device provided in this embodiment, by configuring equal or approximately equal first voltage and second voltage for the pixel electrode 311 when the backlight source is turned on or turned off, the voltage of the pixel electrode 311 can be prevented from being affected by the backlight. Furthermore, the voltage difference between the pixel electrode 311 and the common electrode is stabilized, the brightness uniformity of the display panel 300 is improved, and the water ripple phenomenon is also prevented.

The aforesaid display device, as a device for displaying video or still images, can be not only fixed terminals such as televisions, desktop computers, monitors, or billboards but also mobile terminals such as mobile phones, tablet computers, mobile communication terminals, electronic notepads, electronic books, multimedia players, navigators, or laptops. It can also be wearable electronic devices such as smartwatches, smart glasses, virtual reality devices, or augmented reality devices.

It can be understood that, for one skilled in the art, equivalent substitutions or changes can be made according to the technical solutions and inventive concepts of the present application. These changes or substitutions should belong to the protection scope of the claims in the present application.

What is claimed is:

1. A display device, comprising:

a display panel comprising sub-pixels, wherein each of the sub-pixels comprises a pixel electrode;

a backlight module comprising a backlight light source for the display panel; and a timing controller connected to the display panel and the backlight module, wherein the timing controller controls the pixel electrode to have a first voltage in response to the backlight light source being turned on, and controls the pixel electrode to have a second voltage in response to the backlight light source being turned off, and wherein the first voltage is equal to or approximately equal to the second voltage;

wherein the timing controller comprises a storage unit storing a default grayscale array and a grayscale mapping table;

wherein when the backlight light source is in a turn-on state, the timing controller calls the grayscale mapping table, and when the backlight light source is in a turn-off state, the timing controller calls the default grayscale array; and wherein the grayscale mapping table comprises a target grayscale array, each target grayscale in the target grayscale array is mapped with a corresponding default grayscale in the default grayscale array, and in each mapping relationship, the target grayscale is greater than the default grayscale.

2. The display device of claim 1, wherein when the backlight light source is in the turn-on state, the timing controller outputs a corresponding grayscale to a sub-pixel according to the target grayscale array to control the pixel electrode to have the first voltage, and when the backlight light source is in the turn-off state, the timing controller outputs a corresponding grayscale to the sub-pixel according to the default grayscale array to control the pixel electrode to have the second voltage.

3. The display device of claim 2, wherein when the backlight light source is in the turn-on state, the timing controller maps target grayscales in the target grayscale array through corresponding default grayscale in the default grayscale array to output the target grayscales in the target grayscale array.

4. The display device of claim 1, wherein the timing controller controls the backlight light source to turn on or turn off through a pulse width adjustable signal, and wherein the timing controller further comprises a level detection unit configured to detect a potential state of the pulse width adjustable signal.

5. The display device of claim 4, wherein when the level detection unit detects that the pulse width adjustable signal is in a high potential state, the timing controller controls the backlight light source to be in the turn-on state, and when the level detection unit detects that the pulse width adjustable signal is in a low potential state, the timing controller controls the backlight light source to be in the turn-off state; or when the level detection unit detects that the pulse width adjustable signal is in a low potential state, the timing controller controls the backlight light source to be in the turn-on state, and when the level detection unit detects that the pulse width adjustable signal is in a high potential state, the timing controller controls the backlight light source to be in the turn-off state.

6. The display device of claim 1, wherein the display panel further comprises a data driver, wherein the data driver is connected to the timing controller and the sub-pixels and configured to output a corresponding data signal to each sub-pixel under control of the timing controller, and wherein each target grayscale or each default grayscale is a corresponding pulse amplitude of the data signal.

7. The display device of claim 1, wherein each sub-pixel further comprises a thin film transistor connected to the pixel electrode, and wherein electron mobility of the thin film transistor when the backlight light source is in the turn-on state is less than electron mobility of the thin film transistor when the backlight light source is in the turn-off state.

8. The display device of claim 1, wherein the backlight light source comprises a micro-light-emitting diode array, the backlight light source comprises one or a plurality of backlight sub-regions, and the timing controller controls brightness of each of the plurality of backlight sub-regions.

9. An electronic equipment, comprising a display device of claim 1, the display device comprising:

a display panel comprising sub-pixels, wherein each of the sub-pixels comprises a pixel electrode;

a backlight module comprising a backlight light source for the display panel; and a timing controller connected to the display panel and the backlight module, wherein the timing controller controls the pixel electrode to have a first voltage in response to the backlight light source being turned on, and controls the pixel electrode to have a second voltage in response to the backlight light source being turned off, and wherein the first voltage is equal to or approximately equal to the second voltage;

wherein the timing controller comprises a storage unit storing a default grayscale array and a grayscale mapping table;

wherein when the backlight light source is in a turn-on state, the timing controller calls the grayscale mapping table, and when the backlight light source is in a turn-off state, the timing controller calls the default grayscale array;

wherein the grayscale mapping table comprises a target grayscale array, each target grayscale in the target grayscale array is mapped with a corresponding default grayscale in the default grayscale array, and in each mapping relationship, the target grayscale is greater than the default grayscale; and wherein the display panel is a liquid crystal display panel.

10. The electronic equipment of claim 9, wherein when the backlight light source is in the turn-on state, the timing controller outputs a corresponding grayscale to a sub-pixel according to the target grayscale array to control the pixel electrode to have the first voltage, and when the backlight light source is in the turn-off state, the timing controller outputs a corresponding grayscale to the sub-pixel according to the default grayscale array to control the pixel electrode to have the second voltage.

11. The electronic equipment of claim 10, wherein when the backlight light source is in the turn-on state, the timing controller maps target grayscales in the target grayscale array through corresponding default grayscale in the default grayscale array to output the target grayscales in the target grayscale array.

12. The electronic equipment of claim 9, wherein the timing controller controls the backlight light source to turn on or turn off through a pulse width adjustable signal, and wherein the timing controller further comprises a level detection unit configured to detect a potential state of the pulse width adjustable signal.

13. The electronic equipment of claim 12, wherein when the level detection unit detects that the pulse width adjustable signal is in a high potential state, the timing controller controls the backlight light source to be in the turn-on state, and when the level detection unit detects that the pulse width adjustable signal is in a low potential state, the timing controller controls the backlight light source to be in the turn-off state; or when the level detection unit detects that the pulse width adjustable signal is in a low potential state, the timing controller controls the backlight light source to be in the turn-on state, and when the level detection unit detects that the pulse width adjustable signal is in a high potential state, the timing controller controls the backlight light source to be in the turn-off state.

14. The electronic equipment of claim 9, wherein the display panel further comprises a data driver, wherein the data driver is connected to the timing controller and the sub-pixels and configured to output a corresponding data signal to each sub-pixel under control of the timing controller, and wherein each target grayscale or each default grayscale is a corresponding pulse amplitude of the data signal.

15. The electronic equipment of claim 9, wherein each sub-pixel further comprises a thin film transistor connected to the pixel electrode, and wherein electron mobility of the thin film transistor when the backlight light source is in the turn-on state is less than electron mobility of the thin film transistor when the backlight light source is in the turn-off state.

16. The electronic equipment of claim 9, wherein the backlight light source comprises a micro-light-emitting diode array, the backlight light source comprises one or a plurality of backlight sub-regions, and the timing controller controls brightness of each of the plurality of backlight sub-regions.

* * * * *